May 3, 1966  I. JEPSON ETAL  3,248,867
CLOCK MOTOR AND MOVEMENT
Filed Nov. 7, 1963   6 Sheets-Sheet 5

INVENTORS:
Ivar Jepson
John W. Morgan
James W. Richmond
By George R. Clark   Atty May 3, 1966 I. JEPSON ET AL 3,248,867
CLOCK MOTOR AND MOVEMENT
Filed Nov. 7, 1963 6 Sheets-Sheet 6

INVENTORS:
Ivar Jepson
John W. Morgan
James W. Richmond
By George R. Clark Atty 3,248,867
CLOCK MOTOR AND MOVEMENT
Ivar Jepson, Oak Park, John W. Morgan, Elmhurst, and James W. Richmond, Bensenville, Ill., assignors to Sunbeam Corporation, Chicago, Ill., a corporation of Illinois
Filed Nov. 7, 1963, Ser. No. 322,218
14 Claims. (Cl. 58—26)

This invention relates to electric clocks and relates more specifically to a motor and movement for use in an electric clock.

The electric clock, as it is known in this country today, has reached a very advanced stage of development as far as both accuracy of operation and low cost are concerned. These clocks are driven by small electric motors which are capable of driving a clock movement with almost no timekeeping error for many years. In spite of the complexity and long life requirements of these motors and movements, mass production techniques have reduced their manufacturing costs to less than $2.00.

There are essentially two different types of synchronous motors which have been used to drive the clock movements. The type which is used in the greatest volume is a hysteresis type motor having a high speed rotor driven by a shaded pole field at a speed of 3600 revolutions per minute. Shading rings are used on each of the two poles. The high speed rotation of the armature requires very sophisticated lubrication techniques for it to operate for extended periods of time with no maintenance, lubrication or other attention. It has been common practice to seal the high speed rotor and the first few stages of gear reduction in a closed capsule which excludes dirt and foreign matter and makes the lubrication of the bearings easier to accomplish. Even with the incapsulation of the high speed rotor and the gearing, it is difficult to reduce the gear noise to the desired level, and there is a tendency for bearing problems to develop prior to the expiration of the desired design life of the clock. Obviously, the high shaft and gear speeds in the above-described high speed motor make it inherently more noisy and subject to malfunctioning problems than the less popular type of clock motor which utilizes a slower speed armature.

In this second type of motor which is also a hysteresis type motor, the number of field poles is increased substantially so that the rotor speed is often no more than 400 revolutions per minute. As a consequence, the lubrication and noise problems are reduced considerably. There are other problems associated with the increased poles and rotor size which have made them expensive and difficult to manufacture. Because of the necessity for shading rings in connection with the poles of the hysteresis type motor, each of the field poles must be split and space must be provided between the poles to permit the copper shaded ring to surround each split field pole. If a 400 r.p.m. armature speed is desired, there must be provided 18 field poles. Each of these poles must be split so that the rotor must be made large enough in diameter to accommodate 36 poles around its periphery. The provision of this many separate poles as well as the application of the shading rings for half of them and the necessity for a large diameter rotor mounted accurately for precise rotation in a plane perpendicular to its axis further increases the cost of the slow speed hysteresis motor.

In recent years, there have appeared on the market several clock motors utilizing permanent magnet rotors. These motors are termed repulsion or inductor motors and have quite different operating characteristics and design problems from the hysteresis motor which had formerly been used universally in the clock and timer field. The inductor motor characteristically employs a permanently magnetized rotor as contrasted with the hysteresis motor rotor which was merely made of a magnetic or ferrous material. In addition, the inductor motor employs alternate field poles of opposite plurality with no split poles or shading coils being employed. As a consequence, the magnetic field produced in the inductor type motor has no directional characteristic and will support rotation of the rotor in either direction. The hysteresis type motor, on the other hand, by virtue of its shaded poles, produces a rotating field which is directional and which will support rotor rotation in only one direction. Another distinguishing aspect is the fact that the hysteresis motor will produce subsynchronous rotor torque permitting the rotor to rotate at less than synchronous speeds while building up to speed. The inductor motor, on the other hand, has almost no rotational torque at other than synchronous speed. The lack of directional characteristics and the lack of subsynchronous torque has presented substantial problems in the use of the inductor motor in clock and timer applications.

Prior art examples of inductor type motors have required such precision in the positioning of the field poles and the rotor manufacture that they have presented little advantage from a cost standpoint over the hysteresis motors heretofore used in the timer art. In addition, there have been no successful attempts at producing an inductor type motor having a very slow armature speed, i.e., on the order of 200 revolutions per minute. It would be desirable to provide a simplified inductor type motor for use on clocks and timers. This motor should be designed to permit its integration with the movement of a clock and be adapted to fabrication in mass production manufacturing facilities.

Turning now to the movement portion of the present day electric clock, we find that it is conventionally separate and independent from the clock motor. The movement usually takes the form of a pair of supporting plates spaced apart by metal supporting posts and between which are mounted the reduction gearing. The synchronous motor is then secured to one of the plates in driving engagement with the input gear of the movement. While this arrangement is somewhat flexible in permitting the use of various combinations of motors and movements depending on the types of clocks or timers for which they are designed, it results in a somewhat bulky and expensive clock mechanism. It would be desirable, therefore, to provide a more compact and less complicated motor and movement mechanism for an electric clock.

While it is known in the art to employ jeweled bearings in connection with clocks, these jeweled bearings are only used on the very expensive clocks. Most mass produced clocks and movements have very simple and rudimentary bearings for the shafts supporting the gearing therein. In most cases, the shafts are merely received in holes in the supporting frame or plates. In some cases, brass bearings are used in connection with the shafts rotating at higher speeds. In some instances, the frames or supporting plates are made of a bearing material such as brass to avoid the necessity for providing bearings. It would be desirable to provide a clock movement in which the cheapest, most inexpensive frame material could be used and at the same time to provide inexpensive bearings to support the shafts of the movement.

Another problem associated with the clock movement and its bearings relates to the assembly of the gear supporting shafts to their frame or plates in which they are journaled. In general, the shafts are all assembled to one plate and then the second plate is assembled thereto. This presents a problem of guiding a number of shafts simultaneously into openings in the second support plate as it is assembled. As a consequence, the assembly operation of these movements is extremely tedious, time consuming and demanding of much skill and concentration. It would be desirable to provide shaft support means which would facilitate the assembly of the movement supporting plates to the shafts carried thereon.

Because of the high degree of automation associated with the production of a clock motor and movement, it is common for the same motor and movement to be used in all the clocks and timers manufactured by a single company. It is necessary, therefore, that the motor and movement be mounted in many different types of cases and mountings. Since the motor and movement characteristically have front and rear supporting plates, this variation in mounting will seem to present no particular problem. In many applications, however, it is desirable that the mounting means for the motor and movement be accommodated in as small an area as possible. The reason for this requirement is the desire for small compact and streamlined styling in connection with most timekeeping instruments. The smaller and more compact the motor and movement are, the more freedom which may be exercised by the designer and stylist. It would be desirable, therefore, to provide a clock motor and movement with mounting means which would be accommodated substantially within the outer limits of the mechanical portions of the motor and movement. In this way, the mounting means would add no more to the bulk or volume of motor and movement than that required for the unit itself.

It is an object of the present invention to provide an improved synchronous motor and movement for use in clocks and timers.

It is a further object of the invention to provide an improved method of making a clock motor and movement.

It is another object of the invention to provide a clock movement in which the motor is integrated with the movement supporting frame.

It is an additional object of the invention to provide an improved inductor type motor designed for integration with the movement of a clock.

Another object of the invention is to provide an integrated clock motor and movement in which the movement supporting plates form portions of the motor field.

A still further object of the invention is to provide an improved clock motor and movement in which all of the parts of the motor and movement are supported between two spaced plate members.

Another object of the invention is to provide integrally molded parts on the metallic support plates of a clock movement to facilitate mounting of the movement and support of the shafts for the movement gearing.

Still another object of the invention is to provide an integrated clock motor and movement having bearings on opposed support plates with the bearings on one of the plates provided with guiding portions to facilitate assembly of the plate to the shaft included in the motor and movement.

A further object of the present invention is to provide bosses for the purpose of mounting an integrated compact motor and movement. These bosses are provided with mounting surfaces which are located substantially on a plane extending through the center of the motor and movement and these mounting portions are accessible from either the front or the back of the movement for mounting purposes.

Further objects and advantages of the present invention will become apparent as the following description proceeds and the features of novelty which characterize the invention will be pointed out with particularity in the claims annexed to and forming a part of this specification.

For a better understanding of the present invention, reference may be had to the accompanying drawings in which.

Figure 1:
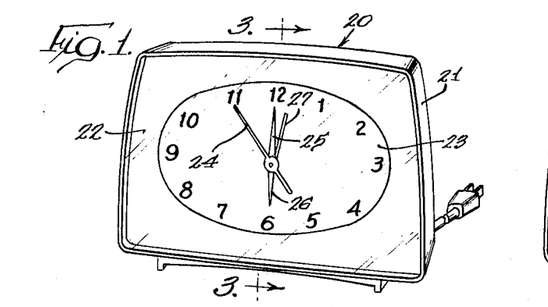
FIGURE 1 is a perspective view of an electric alarm clock embodying the present invention.

Referring now to the drawings, there is illustrated in FIG. 1 an electric clock generally indicated at 20 comprising a suitable casing 21 the front of which comprises a transparent plate or crystal 22 so as to expose to view a clock face 23 of conventional construction. Disposed between the transparent crystal 22 and the clock face 23 are a sweep second hand 24, a minute hand 25, an hour hand 26 and an alarm indicator 27. The hands 24, 25, 26 and 27 are rotatable about a common axis and supported on an arrangement of concentric shafts.

The electric clock 20 disclosed in FIG. 1 insofar as the appearance or design thereof is concerned forms no part of the present invention and is included merely for the sake of a complete disclosure. Essentially, the invention is concerned with an improved electric clock motor and movement in which the mechanism of the motor and movement have been integrated together to provide a simple and compact structure for powering an electric clock. This integrated motor and movement is adapted for use in connection with any types of clocks regardless of the size, shape or design. One aspect of the invention relates to the mounting structure which permits it to be mounted from the front of the casing as illustrated in FIG. 3 or from the back as illustrated in FIG. 4.

Figure 3:
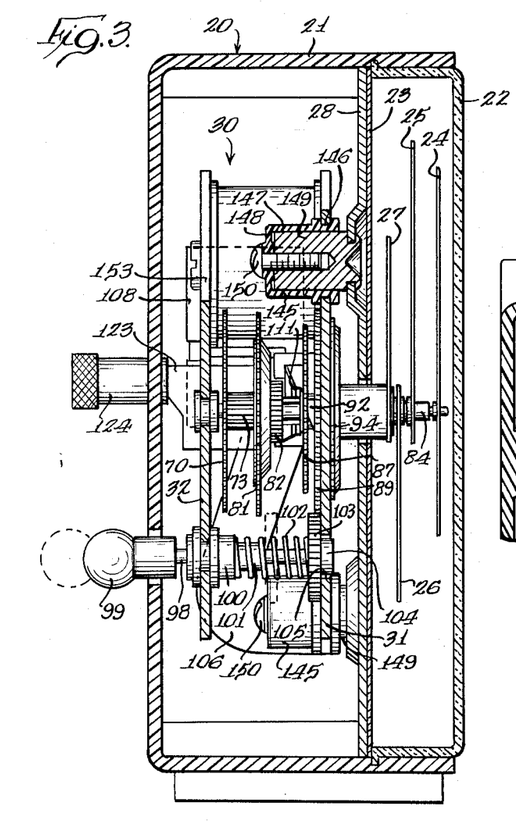
FIG. 3 is an enlarged sectional view taken on line 3—3 of FIG. 1.
Figure 4:
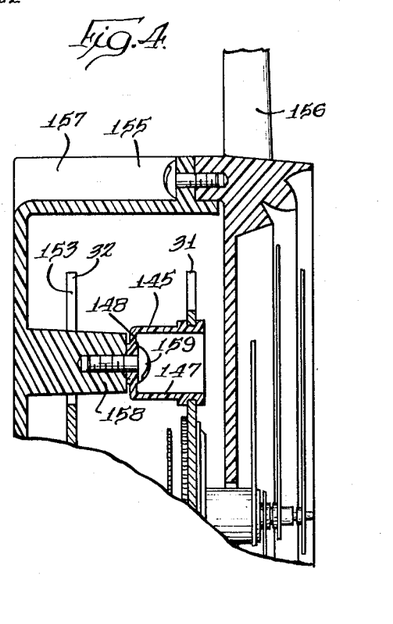
FIG. 4 is an enlarged sectional view through one of the mounting bosses for the motor and movement of the present invention showing an alternative mounting arrangement.
Figure 7:
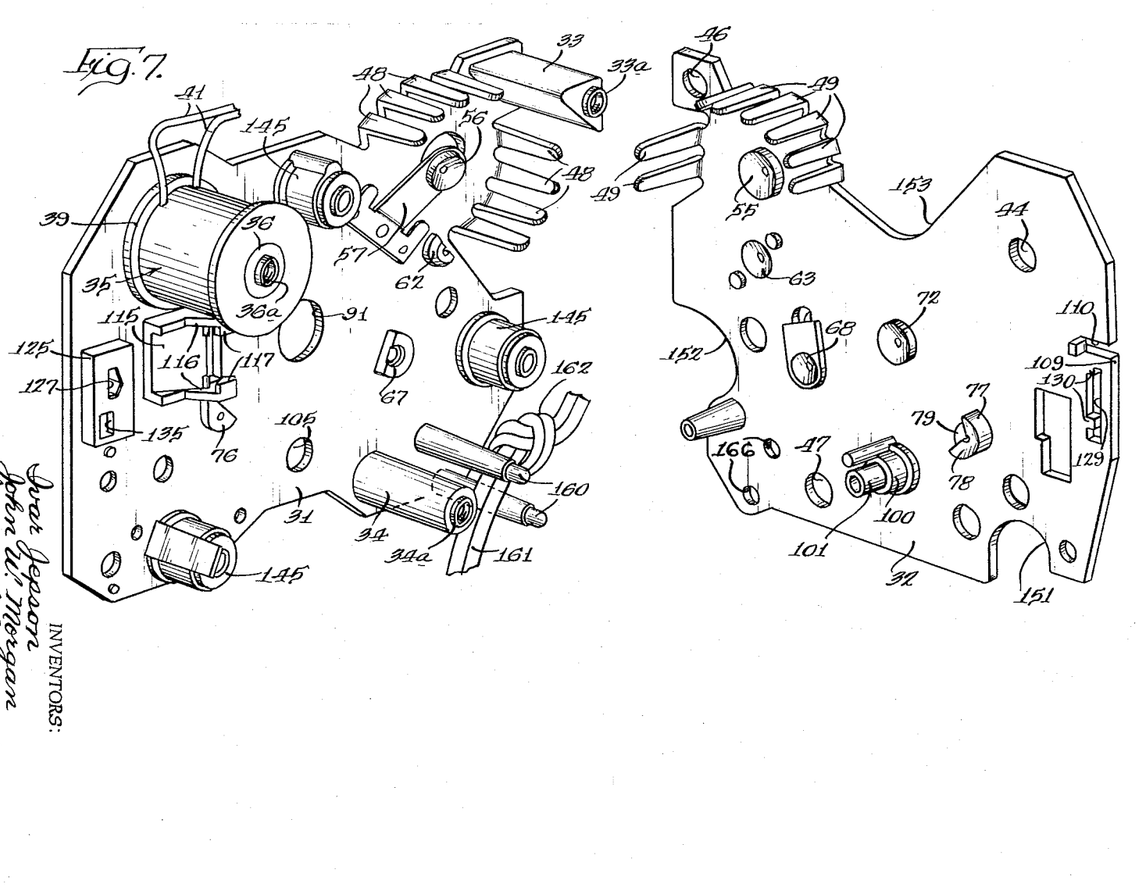
FIG. 7 is an exploded perspective view of the front and rear supporting plates or frame members for the electric clock motor and movement.

Referring now to FIG. 3 of the drawings, there is illustrated the electric clock 20 which includes a front plate 28 on which is supported the integrated motor and movement generally indicated at 30. All of the parts of the clock motor and movement 30 are carried and supported on a front support member or plate 31 in a rear support member or plate 32 as are best illustrated in FIG. 7. The front and rear support members 31 and 32 form a frame when supported in spaced relation by means of a pair of support posts 33 and 34. As is best shown in FIG. 7, the upper support post 33 is in one corner while the lower support post is centrally located on the bottom of plate 31.

Along the upper edge of the plate 31 in the corner opposite post 33 there is located a motor field coil 35 which includes a ferrous core 36. The front end of the core 36 is shouldered with a reduced portion 37 extending through an opening 38 in the plate 31. The forwardmost end of the portion 37 is staked over to retain the core 36 assembled to the front support plate 31.

Received on the core 36 is a plastic bobbin 39 which supports coil windings 40 having leads 41 for energization thereof. In order to retain the plastic bobbin 39 on the core 36 during the assembly and to prevent rotation of coil 35 with respect to support plate 31, the core 36 is provided with a knurled portion 42. This knurled portion 42 interferes with and digs into the plastic of the bobbin 39 retained thereon. As is best shown in FIG. 7, the motor field core 35 is arranged on the front support member 31 approximately equidistant from the support posts 33 and 34. The motor field core 36 actually forms a third support post by means of which the plates 31 and 32 are rigidly mounted in spaced relation to each other. Assembly screw 43 extends through an opening 44 in the rear support plate 32 into threaded engagement with the core 36. Similar screws 45 extend through openings 46 and 47 in the plate 32 for threaded engagement with the support posts 33 and 34 respectively. Actually the support posts 33, 34 and the coil core 36 have shouldered projections 33a, 34a and 36a respectively which extend into openings 46, 47 and 44 to accurately position the plates 31 and 32 relative to each other.

Figure 8:
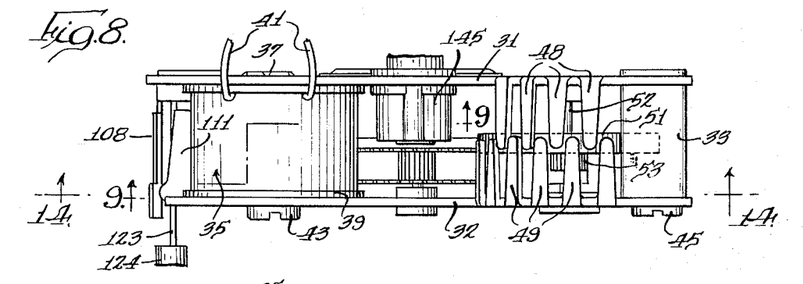
FIG. 8 is a top plan view of the electric clock motor and movement of FIGS. 5 and 6.

The front and rear support plates 31 and 32 are formed of a ferrous or magnetic material and serve as field members for the motor portion of the integrated clock motor and movement 30 as well as serving as support members for the various shafts included in the movement portion. Adjacent the corner in which the support post 33 is positioned, there are formed integrally with the plates 31 and 32 a plurality of field poles 48 and 49. The field poles 48 and 49 extend perpendicular to the respective plates 31 and 32 from which they are formed. The field poles 48 on the plate 31 are arranged in two groups of four which are spaced on either side of the support post 33 as may best be seen in FIG. 7. The poles 49 on the plate 32 are arranged with two poles on one side of the post 33 and six poles on the other side providing a total of eight field poles on each of the plates 31 and 32. The poles are arranged so that some of poles 48 and 49 are interspersed, as shown in FIG. 8, when the plates 31 and 32 are assembled together. It may be also noted from FIG. 8 that the poles 48 and 49 extend inwardly to a common central plane.

Mounted in this plane for rotation about an axis substantially perpendicular to the two plates 31 and 32 is a permanent magnet rotor 51 made of any suitable material such as barium ferrite powder supported by suitable binder material. The rotor 51 has been magnetized with thirty-six alternate north and south poles peripherally spaced around the outer edge thereof. The poles need only be magnetized to a depth of .030″ or .040″ to function in the well known manner in repulsion or inductor type motors. The poles on the rotor 51 are each centered approximately ten degrees apart. Similarly, the field poles 48 and 49 are arranged to be ten degrees apart in the area where they are interleaved together. Accordingly, the poles 48 on the support member 31 are formed twenty degrees apart and/or multiples of twenty degrees apart as are the poles 49 formed on the support member 32.

The rotor 51 is supported on a shaft 52 which is press fitted to a hole therein. The shaft 52 also supports a small resilient pinion 53 which drivingly relates the motor portion with the movement.

Before considering the manner in which the rotor shaft 52 and the portions of the movement are supported, brief mention will be made of the manner in which the plates 31 and 32 are prepared for assembly to the clock motor and movement 30. As was mentioned above, the plates 31 and 32 are fabricated from a ferrous or magnetic material so that they may serve as field members in connection with the electric motor. The plates 31 and 32 may be manufactured by simply stamping cold rolled steel to the configuration shown including the various openings and holes shown thereon. In addition, the field poles 48 and 49 may be formed at the time of the stamping of these plates. It is important to note that the field poles 48 and 49 all extend upwardly from the edges of the plates 31 and 32 with none of them being sheared from internal sections of the plates 31 and 32. As a consequence, these plates may be easily and inexpensively produced in a stamping and forming operation.

After the plates 31 and 32 have been formed, they are each subjected to a single plastic molding operation in which all of the bearings for the clock motor and movement 30 as well as the previously described support posts 33 and 34 and other plastic parts to be described below are molded to the respective plates 31 and 32 with the plastic interlocking with the plates so that these parts become essentially integral parts of the plates 31 and 32. In this operation, the plates are positioned in closed molds, and using injection molding, the plastic bearings and posts are molded to the stamped plates. In one constructed embodiment, plastic used is sold under the Du Pont trademark "Delrin" and provides very satisfactory bearing characteristics.

Figure 15:
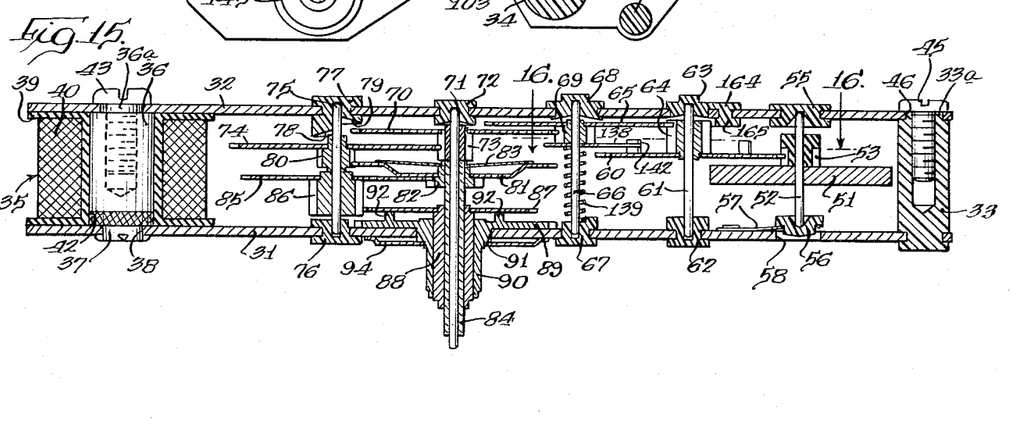
FIG. 15 is a sectional view taken along line 15—15 of FIG. 14 assuming FIG. 14 includes all the structure of FIG. 5 to present a somewhat schematic layout of the motor and movement gearing.

Turning back to the specific bearing means for the rotor shaft 52, as is best shown in FIGS. 7 and 15, the shaft 52 is provided with a rear conical bearing 55 which is molded to the plate 32. To support the front end of the rotor shaft 52, a movable bearing 56 is provided which is carried by a leaf spring member 57. The spring 57 is secured at its free end to the bearing 56 and at the other end to the plate 31. A clearance opening 58 is provided in the support plate 31. The two conical "Delrin" plastic bearings 55 and 56 provide a low friction mounting for the rotor shaft 52 which is necessary because of the low starting torque possible with the impulse type permanent magnet motor. The spring mounting for the bearing 56 provides a simple means for accurately controlling the bearing pressure and for taking up wear which would otherwise create a problem in supporting the rotor 51 for accurate concentric rotation over years of use without lubrication for the bearings. When the field core 35 is energized by conventional 60 cycle per second alternating current, the rotor 51 turns at the rate of 200 revolutions per minute.

Figure 14:
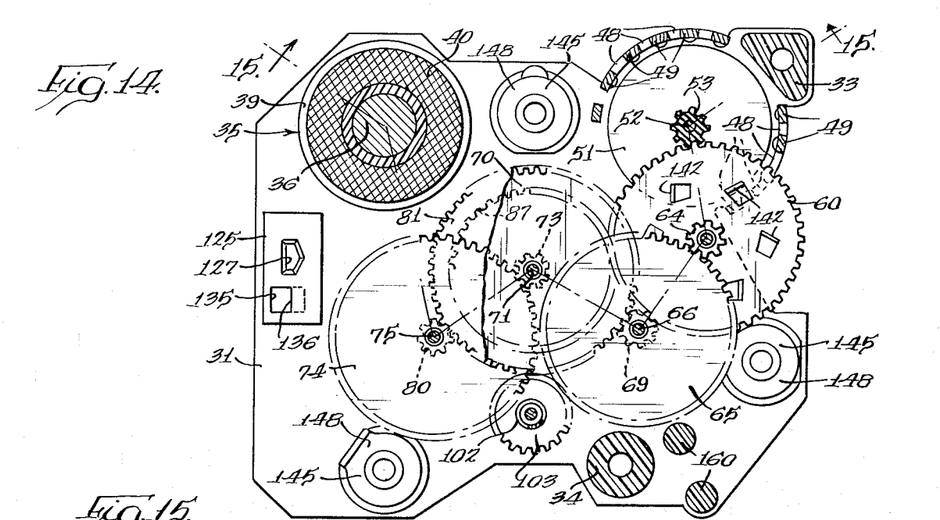
FIG. 14 is a sectional view of the electric clock motor and movement taken substantially along line 14—14 of FIG. 8 with the alarm lever omitted for the purpose of more clearly showing the gearing.

While the movement itself, as to the number of gears and arrangement of the gears forms no part of the instant invention, the details should be considered for a complete appreciation of the disclosed embodiment of the invention and more specifically for an understanding of the novel manner in which the motor and movement have been integrated together. In this connection, attention is directed to FIGS. 14 and 15 which show the output pinion 53 on the motor shaft 52 as drivingly engaging a large gear 60 which will be described in greater detail later below in connection with the directional starting mechanism. The gear 60 is mounted on a shaft 61 supported in suitable bearings 62 and 63 molded to the plates 31 and 32 respectively. Staked to the gear 60 is a pinion 64 which rotates in driving engagement with a gear 65. The gear 65 is carried by shaft 66 mounted in bearings 67 and 68 which are also molded to the plates 31 and 32 respectively. Mounted for rotation with the gear 65 is a pinion 69 which drives the sweep seconds gear 70 at the rate of one revolution per minute. The sweep seconds gear 70 is secured to and supported for rotation with a shaft 71, the rear end of which is received in a bearing 72 molded to plate 32. The sweep seconds shaft 71 extends forwardly through front plate 31 to a point where it receives the sweep seconds hand 24. Staked to the sweep seconds gear 70 and arranged to rotate with the gear 70 and the shaft 71 is a pinion 73 which drivingly engages a gear 74 supported for rotation on a shaft 75. The shaft 75 is journaled for rotation in a front bearing 76 and a rear bearing 77.

It should be noted that each of the aforementioned rear bearings 63, 68, 72 and 77 is formed with a conical entrance approaching a cylindrical shaft journalling portion of the bearing. While a portion of the bearing 77 has been cut away to provide clearance for the gear 70 it should be noted that there are still conical portions to direct the shaft 75 inwardly into seated position. An upper conical portion 78 is positioned to the left as shown in FIG. 15, and a lower conical portion 79 is positioned to the right. The purpose of the conical portions on the bearings carried by the plate 32 is to permit easy assembly of the shafts 61, 66, 71 and 75 thereto. During the assembly operation, the shafts with their associated gearing are initially assembled to the bearings 62, 67 and 76 and the plate 32 is then placed on top. Were it not for the conical bearing recesses, it would be extremely difficult and tedious to target these shafts into their respective bearing openings. With the help of the conical guiding portions the shafts fall into their positions in the bearings with almost no guidance from the operator assembling the parts.

Staked to the gear 74 and adapted to rotate therewith is a pinion 80 which drivingly engages the minute gear 81. The minute gear 81 is rotatably supported on a gear member 82 which carries on its rearward end a spring disc 83 which frictionally and drivingly relates the minute gear 81 to the gear member 82. The gear member 82 is in turn press fitted on the minute shaft 84. The frictional driving arrangement between the minute gear 81 and the minute shaft 84 is conventional and is provided to permit setting of the minute and hour hands without rotating the portion of the movement driving from the motor to the minute gear.

The gear member 82 is in driving engagement with an intermediate gear 85 which is rotatably supported on the shaft 75 along with the gear 74. The intermediate gear has staked thereto a pinion 86 which rotates therewith and is in driving engagement with hour gear 87 which is secured to the tubular hour shaft 88. It should be understood that the minute shaft 84 carries at its outer end the minute hand 25 and the hour shaft 88 carries at its outer end the hour hand 26. Journalled to rotate in engagement with the outer cylindrical surface of the hour shaft 88 is the alarm gear 89 which includes a forwardly projecting tubular portion 90 which supports at its outer end the alarm set indicator 27. The tubular portion or shaft 90 rotates in engagement with the hour shaft 88 and its outer diameter at the inner end is received in an opening 91 in the support plate 31.

As is conventional, the alarm gear 89 is provided with sloping cams or cam projections 92 which are adapted to engage annular openings 93 in the alarm gear 87. The cams 92 projecting from the alarm gear 89 are annular in shape and are different distances from the center of rotation. Similarly, the annular openings in the hour gear 93 are spaced from the axis of rotation of the hour gear distances correspondingly to the two cam projections 92. Thus, at only one point in the rotation of the hour gear with respect to the alarm gear will the cam projections 92 enter the openings 93 in the hour gear. The hour gear 87 is supported on the cam projections 92 until such time as the openings 93 and the hour gear 87 become properly aligned. At that time, the hour gear moves axially as may best be appreciated by comparing FIGS. 10 and 11 which show the hour gear in its two alternative positions.

To retain the alarm gear 89 assembled to the front support plate 31 in a manner so that it may be selectively and rotatably positioned with respect thereto, there is provided a spring disc 94 which is staked to the outer diameter of the alarm shaft 90. The outer periphery of the spring disc 94 is flanged rearwardly and engages the support plate 31. The frictional engagement between the spring disc 94 and the plate 31 permits rotation of the alarm gear 94 when desired but retains it in the position selected even against the tendency of the hour gear 87 to rotate it by virtue of the engagement between the hour gear 87 and the alarm cam projections 92.

Figure 2:
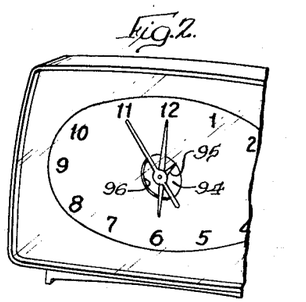
FIG. 2 is a fragmentary perspective view of an electric alarm clock showing an alternative embodiment of the alarm set indicator mechanism.
Figure 5:
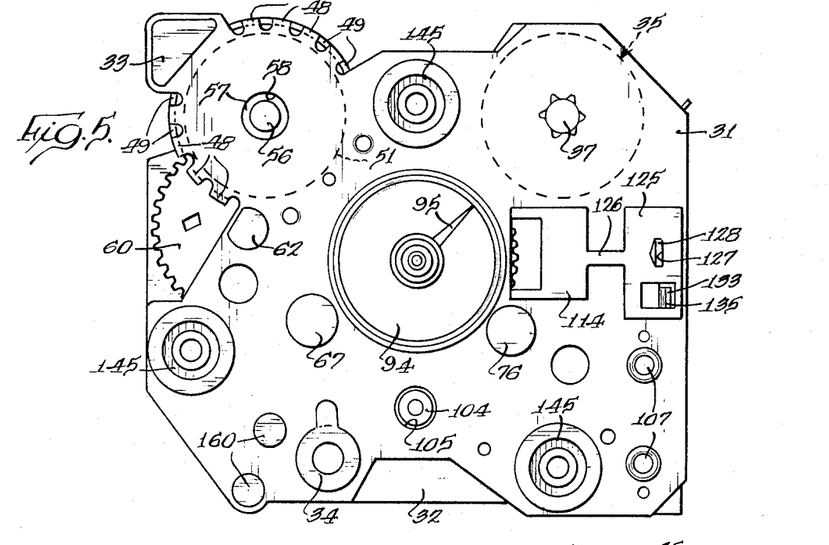
FIG. 5 is a front elevational view of the electric clock motor and movement of the present invention shown with the clock casing removed.

It is contemplated in one embodiment of the invention, that the spring disc 94 may be provided with suitable indicia 95 as is best shown in FIGS. 2 and 5. By providing an opening 96 in the clock face to permit observation of the spring disc 94 an arrangement will be provided whereby the alarm indicator hand 27 could be eliminated completely. The spring disc 94 would then serve the dual function of retaining the alarm gear 89 in the position selected and also in indicating to the user of the clock the time for which the alarm was set to sound.

To permit setting of the hands of the clock as well as for setting the alarm gear 89, there is provided an axially movable shaft 98 which carries on its outer end a plastic knob 99 suitable for manual actuation. As is best shown in FIG. 3, the shaft 98 is supported for rotation and axial movement in an elongated plastic bearing 100 which is molded to the rear supporting plate 32 in the manner described above. The bearing includes a forwardly extending guiding portion 101 of reduced diameter which serves to support on its inner diameter the shaft 98 and receives on its outer diameter a helical spring 102. The shaft 98 receives on its front end a set gear 103 which includes a forwardly projecting guiding boss 104. The guiding boss 104 for the set gear 103 is received in an opening 105 in the front support plate 31. In the position shown in solid lines in FIG. 3, the biasing spring 102 urges the set gear 103 into seated engagement against the support plate 31 with boss 104 engaged in opening 105. In this position, the gear 103 is in driving engagement with the alarm gear 89.

When the set shaft 98 is withdrawn axially to the limit of its movement permitted by the bearing 100, the set gear 103 is positioned in driving engagement with the intermediate gear 85 which is driven by the gear member 82 secured to the minute shaft 84. Thus, in the retracted position rotation of the shaft 98 causes rotation of the gear member 82 and the minute shaft 84 as well as the hour gear 87. In this manner, the minute and hour hands 25 and 26 may be set. The elongated plastic bearing 101 is molded to the support plate 32 and provides a simple and effective means for journalling the set shaft 98 for rotary and axial movement with respect to the clock motor and movement 30.

Figure 6:
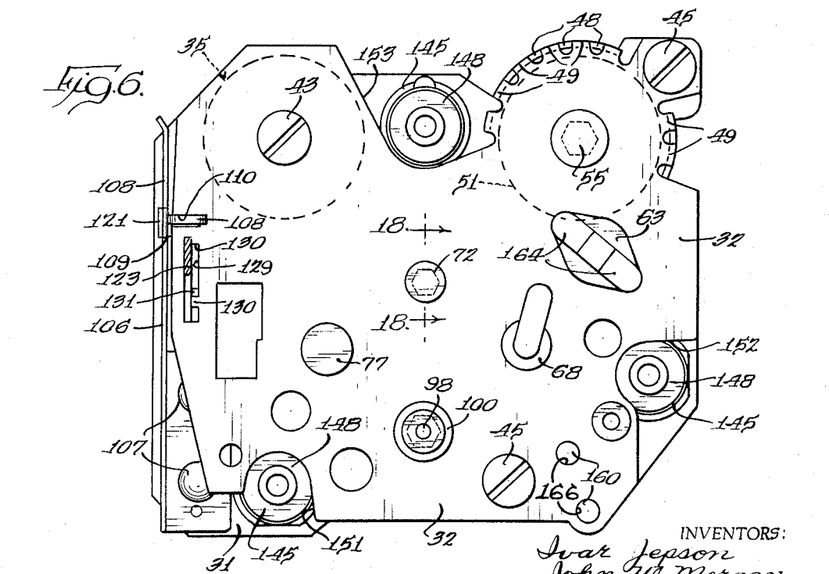
FIG. 6 is a rear elevational view of the electric clock motor and movement shown in FIG. 5.

The alarm mechanism provided on electric clocks conventionally takes the form of a vibrator or reed member positioned in the alternating magnetic field produced by the motor. The vibrator or reed member so positioned is restrained from movement when the alarm is in the shutoff position. When released the vibrator moves rapidly by virtue of the magnetic field producing an audible alarm indication. In the motor and movement 30, a vibrator or reed 106 is secured to the lower edge of plate 31 by rivets 107 as is best shown in FIG. 6. The vibrator 107 includes a free end 108 which extends upwardly adjacent the edge of the rear support plate 32 as is shown in FIG. 3. The portion of the support plate 32 adjacent the free end 108 of the vibrator serves as a magnetic pole face 109 toward which the vibrator end 108 is attracted. Although hardly discernible in FIG. 6, the pole face 109 is angularly disposed so that the vibrator end 108 would engage the support member 32 only at a point adjacent a slot 110 formed therein.

Figures 9, 10, 11, 12, 13:
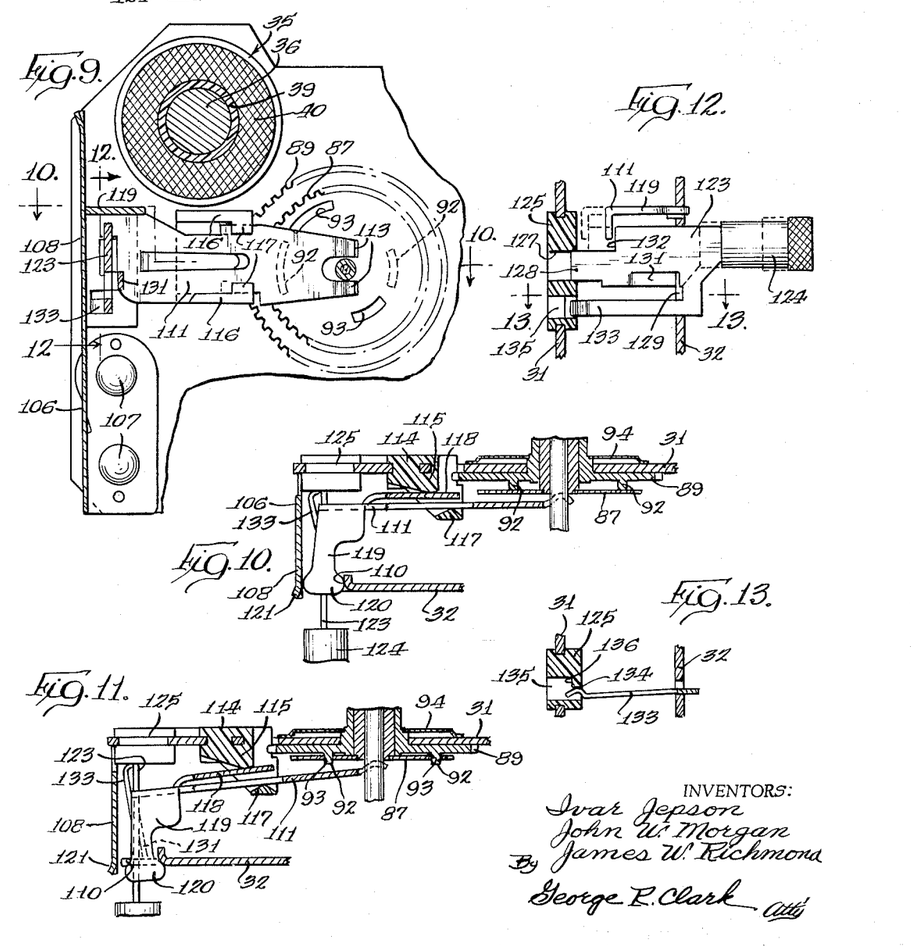
FIG. 9 is a fragmentary sectional view taken substantially on line 9—9 of FIG. 8.
FIG. 10 is a fragmentary sectional view taken on line 10—10 of FIG. 9.
FIG. 11 is a fragmentary sectional view similar to FIG. 10 but showing the alarm lever in the alarm sounding position.
FIG. 12 is an enlarged fragmentary sectional view taken on line 12—12 of FIG. 9 assuming that FIG. 9 shows the entire manual alarm shutoff mechanism.
FIG. 13 is a fragmentary sectional view taken along line 13—13 of FIG. 12.

The purpose of the slot 110 is to guide and support one end of an alarm lever 111. Alarm lever 111 is a somewhat L-shaped member having a flat portion 112 extending substantially parallel to the planes of the plates 31 and 32. The flat portion 112 is bifurcated at its outer end having two projections 113 which engage and ride against the hour gear 87 and its associated shaft 88. The flat portion 112 of the alarm lever is pivoted intermediate at its ends by means of a plastic bearing block 114 which is best shown in FIGS. 9, 10 and 11. The bearing block 114 is molded to the plate 31 as are the other plastic parts and includes a body portion 115 and two side portions 116 from which extend inwardly fulcrum portions 117. The center portion of the alarm lever is provided with a sheared out leg 118 as is best shown in FIGS. 9 and 11. This sheared out portion 118 is actually the biasing spring for the alarm lever and for the purpose of simplification, is formed integrally from the lever 111 itself. As may be seen in FIG. 11, the end of the biasing spring 118 engages the body portion 115 of the bearing block 114 urging the alarm lever against the fulcrum portions 117. Because of the relative positions of the application of the biasing force with respect to the fulcrum 117, the alarm lever 111 is caused to rotate counterclockwise around the fulcrums 117 as viewed in FIG. 11 causing a forwardly biasing force to be exerted against the hour gear 87.

Extending rearwardly from the end of the alarm lever 111 is the vibrator engaging portion 119. The vibrator engaging portion 119 is received with the guide slot 110 described above. The outer end of the portion 119 is provided with an enlargement 120. As shown in FIG. 10, with the alarm gear 87 in the alarm off position, the alarm lever 111 is rotated clockwise until the enlargement 120 is wedged between the plate 32 and the free end 108 of the vibrator 106. This arrangement provides a simple and positive means of immobilizing the vibrator 106 with respect to the support plate 32 when the hour gear 87 is in the alarm shutoff position. To facilitate movement of the alarm lever into the wedging position against free end 108 of the vibrator 106, a struck out portion 121 is provided which forms an inclined ramp so that the enlargement 120 may easily bias the vibrator 106 to its restrained position. This struck out portion 121 is shown in section in FIG. 11 and in plane view in FIG. 6.

In order to maintain the alarm lever in the vibrator restraining or alarm shutoff position, the clock motor and movement 30 includes a manual shutoff plunger 123 which plunger is best shown in FIGS. 3, 9 and 12. The outer end of the shutoff plunger 123 extends rearwardly to a position outside of the clock case 21 where a finger gripping portion or handle 124 is mounted on the end thereof. The finger gripping portion 124 is knurled at its outer end so that the plunger 123 may be easily pushed in and withdrawn.

The plunger 123 is mounted on the plates 31 and 32 for axial, slidable movement in a direction perpendicular to the plane of the plates 31 and 32. To provide a low friction means for slidably supporting the plunger 123 in the front plate 31, there is molded plastic bearing 125 which is interconnected to the bearing block 114 by a small strip of plastic 126 as is best shown in FIG. 5. Thus, the bearing block 114 on which the alarm lever 111 is pivoted is interconnected to the plastic bearing 125 for the shutoff plunger 123. The bearing 125 is formed with a central opening 127 in which is slidably received a forwardly projecting end 128 of the shutoff plunger 123. As will become evident, the plunger 123 is a one-piece stamping including its own guiding, retaining and spring biasing means, or detent means.

Positioned rearwardly of the opening 127 and aligned therewith is an opening 129 in the support plate 32. As is best shown in FIG. 6, the opening 129 is somewhat irregular in shape having cut away portions along the right hand side of the opening. These cut out portions being spaced between projecting portions 130, which slidably engage the side of the shutoff lever 123. The purpose of the clearance openings between the guiding projections 130 are to permit assembly of the formed shutoff lever 123 to the supporting plates 31 and 32.

For retaining the shutoff lever 123 assembled to the clock motor and movement 30, there is formed a retaining projection 131 which is sheared from the central portion of the lever and bent slightly out of the plane of the plunger 123, as is best shown in FIGS. 9, 11 and 12. The retaining lug 131 is bent sufficiently out of the plane of the shutoff plunger 123 so that after assembly of the plunger to the support plates 31 and 32, the retaining lug 131 engages the forward face of the plate 32 to one side of the opening 129. On assembly of the shutoff plunger 123, the retaining lug 131 is deflected slightly passing through the clearance opening between the guiding projections 130.

As may best be seen in FIG. 12, the plunger 123 is formed with a shoulder 132 extending perpendicular to the direction of its sliding movement. The shoulder 132 engages the alarm lever 111 when pushed to its forward position as illustrated in dotted lines in FIG. 12. Thus, when the plunger 123 is pushed to its forward position, the alarm lever 111 is pivoted clockwise as is viewed in FIG. 10, causing the enlargement 120 on the alarm lever to move into wedging engagement between the vibrator 106 and the support plate 32.

Appreciating the fact that the alarm lever 111 is biased in a counterclockwise direction, as viewed in FIGS. 10 and 11, by integral spring 118, means must be provided on the shutoff mechanism to lock the alarm lever against rotation to the alarm sounding position. This function is performed by a detent arm or projection 133 extending sidewardly and forwardly from the rear end of the shutoff plunger 123. As is best shown in FIGS. 12 and 13, the detent projection 133 extends forwardly substantially parallel to the main part of the plunger 123. At its forward end, the detent arm 133 is formed with a cam portion 134 which is received in an opening 135 in the front bearing 125. The opening 135 is positioned adjacent the opening 127 and has a latch projection 136 at the rearwardly opening end thereof. When the manual shutoff plunger 123 is moved to its forward position, the cam portion 134 moves far enough into the opening 135 so that it is hooked behind the latch projection 136. The resilience of the detent projection 133 permits the shutoff plunger to be moved rearwardly when enough force is applied to snap the cam portion 134 across the latch projection 136. This provides a simple and effective detent mechanism which is integrally formed with the shutoff plunger 123 requiring no additional parts to achieve the detent function. It should be noted that the above-mentioned clearance provided in opening 129 is sufficient to permit entrance of the cam portion 134 therein below the lowermost guide projection 130.

It is characteristic of the permanent magnet repulsion or inductor type motor that it is not directional in its starting. That is, the rotor or armature will start in either one of two directions depending on the initial position of the rotor with respect to the field poles. In a clock or timer application, it is of course unacceptable to run the risk of the motor running in the wrong direction even occasionally. The alternative is to have some types of shading coils or other field pole arrangements to get directional starting or to have mechanical means which will reverse the direction of the motor if it starts in the wrong direction. In the clock motor and movement 30, a mechanical directional means has been associated with the movement gears 60 and 65 mentioned above.

Figure 16:
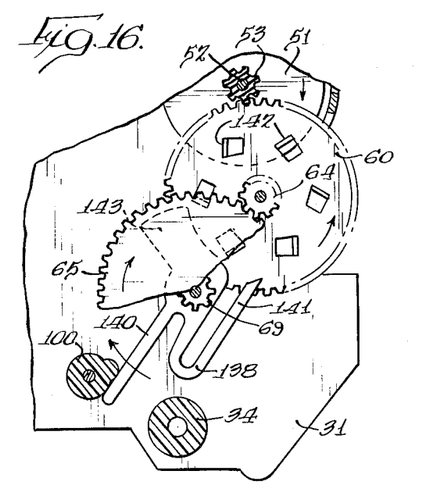
FIG. 16 is a fragmentary sectional view taken on line 16—16 of FIG. 15.
Figure 17:
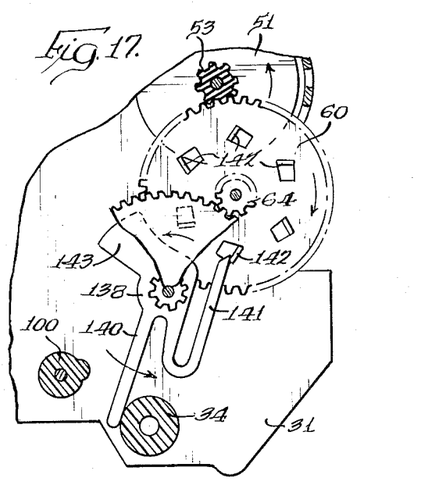
FIG. 17 is a fragmentary sectional view similar to FIG. 16 but showing the directional starting mechanism in the position it assumes when changing the direction of rotor rotation from the incorrect to the correct rotational direction.

As is best shown in FIGS. 15, 16 and 17, there is provided a directional starting member 138 which is mounted for pivotal movement on the shaft 66 which also supports the movement gear 65 and its associated pinion 69. The member 138 is somewhat S-shaped as viewed in plan in FIGS. 16 and 17 and is received on the shaft 66 loosely so that it may rotate with respect to shaft 66. A helical biasing spring 139 is also received on shaft 66 urging the directional starting member 138 into engagement with the pinion 69 as may best be seen in FIG. 15. As a consequence of the biasing spring 139, the member 138 tends to rotate in the same direction as the pinion 69. When the pinion is rotating in the proper direction, which is clockwise as viewed in FIG. 16, the directional starting member 138 also rotates clockwise. A stop projection 140 extending radially outwardly on member 138 engages the above described plastic bearing 100, thus restraining member 138 from further clockwise rotation past the position shown in FIG. 16.

When the rotor commences rotation in a direction such that the gear 65 and its associated pinion 69 is caused to rotate counterclockwise as viewed in FIGS. 16 and 17, the directional starting member 138 is also rotated counterclockwise. Again, the stop projection 140 engages a portion of the motor movement 30, in this case the support post 34, thus preventing further counterclockwise rotation of the member 138 past the position shown in FIG. 17. In the position shown in FIG. 17, however, a resilient directional arm 141 on the member 138 extends into obstructing relation with a plurality of struck out tabs 142 on the gear 60. When one of the tabs 142 strikes the resilient arm 141, the arm 141 is deflected slightly. The gear 60 is then thrown in the counterclockwise direction as viewed in FIG. 17, as a consequence of the resilient arm 141 releasing the energy stored in it at the time of the impact by the tab 142. As the gear 60 is thrown back into counterclockwise rotation by the member 138, the rotor 51 is also caused to change its direction to a clockwise direction, which of course is the desired direction of rotation.

As the gear 60 and the rotor 51 begin rotating in the proper or desired direction, the pinion 69 also rotates in the desired direction whereupon the directional starting member 138 is rotated clockwise to its retracted position as shown in FIG. 16. The resilient arm 141 is then withdrawn from obstructing relation with the tabs 142 on the gear 60. Extending radially outwardly from the axis of the starting member 138 in a direction opposite from the resilient arm 141 is a flat section of metal 143 which merely serves to balance the projection 140 and the arm 141 so that there is no tendency for there to be a twisting moment about the pivotal mounting of member 138 on the shaft 66.

For the purpose of mounting the clock and motor movement 30, there are provided three cup-shaped plastic bosses 145. The mounting bosses 145 are integrally molded into openings 146 in the support plate 31. FIGS. 3 and 4 show sectional views of one of the mounting bosses 145 to demonstrate the various manners in which the motor and movement 30 may be mounted in a clock. Each boss 145 includes a cylindrical side wall 147 and a bottom mounting surface 148 which is positioned in a plane substantially parallel to the support plates 31 and 32 and equidistant therebetween. By having the mounting surfaces 148 of the bosses 145 centrally located with respect to the support plates 31 and 32, complete freedom is achieved in the manner in which the clock motor and movement 30 may be associated with a clock casing or housing.

As shown in FIG. 3, the front plate 28 of the clock 20 is provided with a plurality of rearwardly extending mounting posts 149 which project into the mounting bosses 145 into engagement with the mounting surfaces 148. Screws 150 assembled from the rear extend through the openings in the mounting surfaces 148 into threaded engagement with the mounting posts 149. As shown in FIG. 7, the plate 32 is cut away at the bottom as indicated at 151, on the left side as indicated by 152 and at the top as indicated by 153 to provide clearance or access so that assembly screws 150 may be applied from the rear to the mounting bosses 145.

In FIG. 4 there is shown an alternative type of housing designated 155. The housing 155 is of the type used in the more elaborate decorative clocks which have large ornate casings. The case 155 includes a front portion 156 and a rear housing portion 157. Because of the manner in which the clock is assembled, it is desirable to have the motor and movement 30 secured to the rear housing portion 157. To accomplish this rear mounting, the housing portion 157 is provided with forwardly projecting posts 158. These posts extend through the cut out areas 151, 152 and 153 on the rear support plate 32 into engagement with the mounting bosses 145. Suitable assembly screws 159 extend rearwardly from the inside of the bosses 145 into threaded engagement with the posts 158. It may be seen that by having the bosses cup-shaped, the assembly means 159 do not project forwardly on the face of the support plate 31 but are completely received within the cylindrical portion 147 of the boss 145. Thus, in either of the mounting embodiments shown in FIGS. 3 and 4, the mounting means occupy a minimum amount of space while at the same time bosses 145 have a flexibility permitting either front or rear mounting.

It is conventional to provide some type of strain relief in connection with the power cord used on an electric clock. The strain relief is designed to absorb any force applied to the cord so that the force will not be delievred to the fragile connections between the power cord and the motor field coil for instance. In many instances the strain relief consists of a knot in the cord which bears against a portion of the clock casing or housing. The application of the knot at this point in the assembly of the clock motor movement to the housing is sometimes troublesome and inconvenient. The clock motor and movement 30 is provided with a strain relief which is integral therewith and separate and apart from the clock casing. The strain relief is obtained at a minimum cost since it involves only the molding of a few additional small parts along with the other bearings, support posts, etc., which are molded to the support plates 31 and 32. As is best shown in FIG. 7, a pair of elongated posts 160 are molded in the lower corner of support plate 31 with the posts extending in closely spaced, parallel relation. A power cord 161 is shown for illustrative purposes, the cord having been knotted at 162. It should be appreciated that the end of the cord having the knot extends upwardly into connection with the motor coil leads 41. The other end, after passing between the posts 160, is provided with a suitable length of cord at the end of which is a plug connector. Thus, any force applied to the power cord is absorbed by the knot 162 engaging the posts 160. The reduced outer ends of the post 160 extend through openings 166 in the support plate 32 thereby assuring against any deflection or bending of these posts 160.

Figure 18:
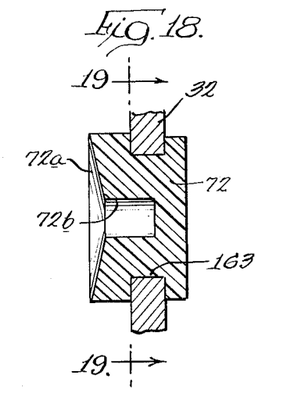
FIG. 18 is a greatly enlarged fragmentary view taken on line 18—18 of FIG. 6.
Figure 19:
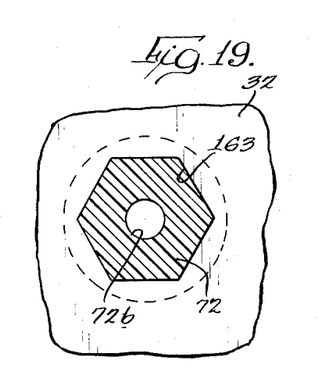
FIG. 19 is an enlarged fragmentary sectional view taken on line 19—19 of FIG. 18 assuming that the entire bearing and frame structure is shown in FIG. 18.

While the plastic used for the bearings and posts, etc. is a very hard, tough material, additional steps have been taken to assure against the loosening of the bearings as they are molded to the plates 31 and 32. In FIGS. 18 and 19 as an example, there is shown in sectional view, the rear bearing for the sweep second hand shaft 72. As was mentioned briefly above in connection with the bearings in support plate 32, there is provided a conical portion 72a which aids in assembling the sweep seconds shaft 71 to a cylindrical bearing opening 72b. As viewed in FIG. 19, it may be seen that the bearing 72 has been molded into a hexagonal opening 163 in the plate 32. By using a hexagonal rather than a round opening, a construction is provided which assures against the rotation of the plastic bearing in the plate 32 after a substantial amount of wear has occurred.

Because of space limitations between plates 31 and 32, the bearing 63 for the movement shaft 61 has been made substantially flush with the inside surface of the plate 32 as is best shown in FIG. 15. This arrangement permits pinion 64 to be mounted closely adjacent the plate 32. To secure the bearings 63 to the plate 32 there are provided outwardly extending portions 164 which extend radially beyond the limits of the pinion 64 and at the point beyond pinion 64 are provided with interlocking projections 165 which extend through openings in plate 32 as is best shown in FIGS. 6 and 15. These radial projections and interlocking portions on bearing 63, of course, also serve the purpose of restraining bearing 63 against rotation with respect to the plate 32.

As is very evident from FIGS. 15, 18 and 19, the plastic bearings support the movement shafts in spaced relation to the plates 31 and 32. Since the plates 31 and 32 are of a ferrous material and serve as field pieces for the motor, it is important to limit the leakage flux passing between the plates 31 and 32, which flux is not usable at the field poles 48 and 49 to drive the rotor 51. Any steel or magnetic members interconnecting the support plates 31 and 32 would tend to short circuit the magnetic flux providing a low reluctance path which much of the flux would follow in preference to passing through the field poles 48 and 49 with their associated air gaps of high reluctance. Since it is preferable to use steel shafts for supporting the gearing in the clock movement for strength and cost reasons, it would be desirable to provide some means for reducing the passage of magnetic flux through these shafts to prevent the efficiency of the motor from being lowered considerably. Through the use of plastic members for both the shaft bearings as well as the supporting posts 33 and 34 extending between the plates 31 and 32, the undesirable paths for the passage of magnetic flux have been substantially eliminated.

In view of the detailed description included above, the operation of the clock motor and movement of the present invention and its associated alarm mechanism will be readily understood by those skilled in the art. It should be appreciated that there has been provided a very simple and inexpensive motor and movement for an electric clock. In its commercial form, which is substantially identical to that which has been disclosed above, the clock motor and movement 30 is only about 2½" square by about ¾" thick. Thus, the integrated motor and movement is approximately the same size as the clock movements which are conventionally used today. This small size of the integrated motor and movement is made possible through the use of the movement supporting plates as field members and the positioning of the field coil in one corner of the movement mounting plates where it occupies substantially unused space. Similarly, the only other motor part which occupies any substantial volume between the movement supporting plates, the rotor 51, is mounted in one corner in such a way that it is overlapping with the movement gearing requiring very little additional space over the space which would be occupied by the movement alone.

The motor field poles 48 and 49 which are simply bent along the edge of the movement supporting plates occupy almost no space and are provided at very little cost. By having the poles arranged at different areas around the periphery of the rotor, it is possible to position all of the poles on the edge of the movement supporting plates and not in the middle area where they would have to be sheared and formed. In addition, by having all of these field poles substantially eliminated in the area toward the movement, it is possible to position the first gear 60 of the movement between the plates 31 and 32 and in direct driving engagement with the pinion 53 carried by the rotor shaft 52. Conventionally, the complete ring of field poles requires the power delivered by the rotor shaft to be taken off outside of rather than between the supporting plates.

The invention is also directed to the method of making the clock motor and movement utilizing the steps of forming the movement supporting plates; placing the plates in molds; molding the bearings, support posts and other elements to the plates; and then assembling them into the motor and movement. This method presents substantial improvements and advantages over any known processes of making a motor and movement of this type.

Through the use of the molded parts on the plates 31 and 32, it has been possible to provide only three stamped parts and the alarm gear to convert a silent movement to an alarm movement. Thus, the alarm lever 111, the vibrator 106 and the shutoff plunger 123 are the only parts in addition to the alarm gear which need to be added to effect such a conversion. The spring disc 94 provides a simple and effective means of eliminating the alarm indicator.

While there have been illustrated and described several embodiments of the present invention as well as the method of making the clock motor and movement which comprise the invention, it will be understood that various changes and modifications may occur to those skilled in the art. It is intended in the appended claims to cover all those changes which fall within the true spirit and scope of the present invention.

What is claimed as new and desired to be secured by Letters Patent of the United States is:

1. A clock motor and movement comprising a pair of spaced ferrous plates, a rotor positioned between said plates and supported by a shaft journaled in said plates, a plurality of field poles formed from integral projections positioned on an outside edge of each of said plates and extending in closely spaced relation to the periphery of said rotor to define a radial air gap between said poles and said rotor, a reduction gear train driven by said rotor and supported on shafts journaled in said plates, a field magnet extending between said plates to produce a magnetic field at said poles, and shafts supported by said plates and driven by said gear train at different rates for driving hour and minute indicating hands.

2. The clock motor and movement of claim 1 wherein said field poles are elongated projections extending from the edges of said plates, said poles being positioned around only half of the periphery of said rotor leaving an unobstructed area between said plates adjacent said rotor for drivingly interrelating said rotor shaft and said reduction gear train.

3. The clock motor and movement of claim 1 wherein said rotor is positioned in one corner of said plates and said field magnet is adjacent thereto in another corner, said reduction gear train and time indicating means occupying the remainder of the area between said plates.

4. The clock motor and movement of claim 1 wherein said rotor is positioned in one corner of said plates and said field magnet is positioned in an adjacent corner, a first post positioned outside of said rotor in said one corner of said plates, a second post at the bottom of said plates equidistant from said first post and said field magnet, said first and second posts and said field magnet rigidly supporting said plates in spaced relation.

5. The clock motor and movement of claim 1 wherein said plates are cut away in the area of said rotor whereby said field poles extend perpendicularly from semicircular projections at the corners of said plates.

6. The clock motor and movement of claim 5 wherein a supporting post extending between said plates and carried by said semicircular projections is positioned in the corner of said plates closely adjacent the periphery of said rotor, said field poles being positioned on either side of said post.

7. An integrated clock motor and movement comprising a pair of spaced parallel substantially coextensive plates of magnetic material, said plates having a field coil extending between said plates in one corner to produce a magnetic field, a permanent magnet rotor carried by a shaft journaled in said plates adjacent another corner of said plates, field pole members formed integrally from said plates and extending inwardly therefrom into closely spaced relation with the periphery of said rotor to define a radial air gap, said pole members being arranged around the outer edges of said plates, a pinion on said rotor shaft, reduction gearing carried by shafts extending between said plates, the input gear of said reduction gearing being of large diameter and engaging said pinion on the side toward the center of said plates.

8. An integrated clock motor and movement comprising a frame including spaced front and rear plates, a permanent magnet rotor supported on a shaft journaled in said plates at one corner thereof, field poles formed integrally from said plates extending inwardly to adjacent the periphery of said rotor, said field poles being positioned along the outer edges of said plates, a motor field coil having a core extending between said plates, support members between said plates spaced from said field coil, means securing said plates to said support members and said field core to provide a motor field and a movement support, and reduction gearing supported on shafts journaled in said plates, two of said shafts extending through one of said plates and driven at different rates for driving hour and minute indicating hands.

9. The clock motor and movement of claim 8 wherein said support members are two non-magnetic posts, one of said posts being positioned outside of said rotor and the other being on the opposite edge of said plate from said one post and said core and substantially equidistant from said one post and said core.

10. The clock motor and movement of claim 8 wherein said reduction gearing shafts being journaled in front and rear bearings provided in said front and rear plates respectively, said rear bearings having cylindrical journal portions and conical guiding surfaces extending outwardly along said shafts.

11. A clock motor and movement comprising a pair of spaced coextensive plates, a permanent magnet rotor supported by a shaft journaled in one corner of said plates, field poles formed integrally from the outer edges of said plates and extending into closely spaced relation with the periphery of said rotor so that the poles from opposite plates overlap to define a radial air gap between said overlapping poles and said rotor, the area around said rotor toward the center of the plates being unobstructed by field poles, a field coil having a core extending between said plates adjacent said rotor, a reduction gear train supported between said plates on shafts journaled therein, and the input gear of said train being larger in diameter than said rotor and driven by a pinion on the rotor shaft.

12. An integrated clock motor and movement comprising front and back supporting plates, a field magnet having a core extending between said plates and a coil surrounding said core, a rotor carried by a shaft extending between said plates, a plurality of elongated spaced pole members formed from integral projections on an outer edge of each plate and extending perpendicular thereto into closely spaced relation to the periphery of said rotor, and reduction gearing supported between said plates on shafts journaled in plastic bearings molded onto said plates.

13. The clock motor and movement of claim 12 wherein said plastic bearings are formed with cylindrical journal portions and the bearings in one of said plates have conical guiding surfaces extending outwardly along said shafts.

14. A clock motor and movement comprising a front support plate and a rear support plate of magnetic material, non-magnetic spacers extending between said plates to support them in spaced relation, a permanent magnet rotor journaled for rotation between said plates and having a plurality of poles around the periphery thereof, pole pieces formed from integral projections on the outer edge of each plate and extending inwardly from said plates into closely spaced relation to the periphery of said rotor, a field magnet between said plates to produce a magnetic field at said pole pieces, a reduction gear train supported between said plates, the individual gears of said train being carried by steel shafts journaled in plastic bearings in said plates whereby leakage flux between said plates through said shafts is substantially eliminated.

References Cited by the Examiner

UNITED STATES PATENTS

| | | | |
|---|---|---|---|
| 1,019,316 | 3/1912 | Gibbs | 29—177 |
| 1,632,305 | 1/1927 | McGrevy | 29—177 |
| 2,400,091 | 5/1946 | Alfthan. | |
| 2,400,099 | 5/1946 | Brubaker. | |
| 2,405,892 | 8/1946 | Lederer et al. | |
| 2,459,598 | 1/1949 | Stott | 308—238 |
| 2,513,913 | 7/1950 | Boyles | 58—23 X |
| 2,729,056 | 1/1956 | Arnold | 58—53 |
| 2,779,150 | 1/1957 | Chartier et al. | 58—16 |
| 2,798,358 | 7/1957 | Heim | 58—16 |
| 2,943,215 | 6/1960 | Pommeret | 310—39 |
| 2,956,394 | 10/1960 | Dubois | 58—140 |
| 3,004,179 | 10/1961 | Chartier et al. | 310—83 |
| 3,010,037 | 11/1961 | Van Horn et al. | 310—39 |
| 3,090,193 | 5/1963 | Jensen | 58—53 |
| 3,098,681 | 7/1963 | Kohlhagen et al. | 308—22 |

FOREIGN PATENTS 91,674 11/1961 Denmark.
1,234,710 5/1960 France.

OTHER REFERENCES

Volkerling, German application (1,049,789) printed January 29, 1959.

LEO SMILOW, *Primary Examiner.*

GERALD F. BAKER, *Assistant Examiner.*